(12) United States Patent
Javadian et al.

(10) Patent No.: US 11,864,289 B2
(45) Date of Patent: Jan. 2, 2024

(54) LIGHT DRIVER SYSTEM WITH MODULAR CONTROLLER BOARD

(71) Applicant: ERP POWER, LLC, Moorpark, CA (US)

(72) Inventors: Vachik Javadian, Glendale, CA (US); Steven C. Krattiger, Northridge, CA (US)

(73) Assignee: ERP POWER, LLC, Westlake Village, CA (US)

( * ) Notice: Subject to any disclaimer, the term of this patent is extended or adjusted under 35 U.S.C. 154(b) by 0 days.

(21) Appl. No.: 17/568,646

(22) Filed: Jan. 4, 2022

(65) Prior Publication Data

US 2022/0272809 A1 Aug. 25, 2022

Related U.S. Application Data

(60) Provisional application No. 63/152,745, filed on Feb. 23, 2021, provisional application No. 63/152,743, filed on Feb. 23, 2021.

(51) Int. Cl.
| | |
|---|---|
| *H05B 45/10* | (2020.01) |
| *H05B 47/11* | (2020.01) |
| *H05B 45/355* | (2020.01) |
| *H05B 47/19* | (2020.01) |
| *H05B 47/105* | (2020.01) |
| *H05B 45/3725* | (2020.01) |
| *H05B 45/12* | (2020.01) |

(52) U.S. Cl.
CPC ........... *H05B 45/355* (2020.01); *H05B 45/10* (2020.01); *H05B 45/12* (2020.01); *H05B 45/3725* (2020.01); *H05B 47/105* (2020.01); *H05B 47/19* (2020.01)

(58) Field of Classification Search
CPC ...... H05B 45/12; H05B 45/10; H05B 45/355; H05B 45/3725; H05B 47/19; H05B 47/11; H05B 47/105; H05B 47/115; H05B 47/175; H05B 45/20; H05B 45/30; H05B 47/10; Y02B 20/40; Y02B 70/10
See application file for complete search history.

(56) References Cited

U.S. PATENT DOCUMENTS

| | | | | |
|---|---|---|---|---|
| 8,248,145 | B2 * | 8/2012 | Melanson | H02M 3/158 |
| | | | | 327/536 |
| 8,432,108 | B2 * | 4/2013 | Kelly | H02M 1/4225 |
| | | | | 315/210 |
| 9,113,528 | B2 * | 8/2015 | Bora | H05B 45/22 |
| 10,278,244 | B1 | 4/2019 | Bahrehmand | |
| 11,163,031 | B1 * | 11/2021 | Zoller | G01S 1/70 |
| 2008/0018261 | A1 * | 1/2008 | Kastner | H05B 45/10 |
| | | | | 315/192 |
| 2011/0090675 | A1 | 4/2011 | Stack et al. | |

(Continued)

*Primary Examiner* — Haissa Philogene
(74) *Attorney, Agent, or Firm* — Lewis Roca Rothgerber Christie LLP

(57) ABSTRACT

A light driver includes a converter configured to generate a drive signal for powering a light source based on a control signal, a modular controller board electrically coupled to a sensor board and configured to receive sensor data from the sensor board and to generate a first sensor control signal corresponding to the sensor data, and a primary controller configured to control the converter by generating the control signal based on the first sensor control signal.

18 Claims, 5 Drawing Sheets

(56) References Cited

U.S. PATENT DOCUMENTS

| | | | |
|---|---|---|---|
| 2012/0286696 A1* | 11/2012 | Ghanem | H05B 45/3725 |
| | | | 315/291 |
| 2013/0026927 A1 | 1/2013 | Uhara | |
| 2015/0296599 A1 | 10/2015 | Recker et al. | |
| 2018/0121662 A1 | 5/2018 | Pelton | |
| 2018/0210524 A1 | 7/2018 | Koenen et al. | |
| 2020/0020223 A1 | 1/2020 | Mann et al. | |
| 2020/0257872 A1 | 8/2020 | Torello et al. | |
| 2020/0314976 A1* | 10/2020 | Soer | H05B 45/37 |
| 2020/0413499 A1 | 12/2020 | Mohan | |

* cited by examiner

LIGHT DRIVER SYSTEM WITH MODULAR CONTROLLER BOARD

CROSS-REFERENCE TO RELATED APPLICATION(S)

This application claims priority to, and the benefit of, U.S. Provisional Application No. 63/152,743 ("ECONOMICAL WIRELESS LED DRIVER CONTROL SYSTEM SOLUTION WITH WIRED ALS, OCC, AND VARIOUS OTHER SENSORS"), filed on Feb. 23, 2021, the entire content of which is incorporated herein by reference.

This application also claims priority to, and the benefit of, U.S. Provisional Application No. 63/152,745 ("LOW-COST ANALOG ALS AND OCC SENSOR DESIGN"), filed on Feb. 23, 2021, the entire content of which is incorporated herein by reference.

The present application is also related to U.S. patent application Ser. No. 17/647,000, entitled "LIGHT DRIVER SYSTEM WITH WIRED SENSOR BOARD", filed Jan. 4, 2022, which claims priority to and the benefit of U.S. Provisional Application Nos. 63/152,743 and 63/152,745, both filed on Feb. 23, 2021, the entire contents of which is incorporated herein by reference.

FIELD

Aspects of the present invention are related to a light driver control system.

BACKGROUND

Existing sensor control lighting solutions provide fragmented systems which incorporate costly and repetitive circuitry that is increasingly more complex for lighting systems with a large number of nodes.

In the related art, lighting solutions may incorporate external sensors with dedicated wireless modules and power circuitry that are needed for running and operating the sensors. This provides additional commissioning and installation cost while increasing the manufacturing cost per wireless sensor. In addition, the issues that arise from multi-master control from both the driver and sensor software remains as a lingering potential issue that is not addressed in such lighting systems.

Existing wireless sensors are inherently costly due to the additional processing, wireless communication modules, and power circuitry that are embedded within the design. The bulky architecture of the related art designs also leads to an increase in wireless communication traffic for larger node systems. As a result, high communication traffic may limit the number of wireless nodes that can be installed in a desired area. Therefore, the size of a multi-node wireless system may be reduced to limit communication traffic.

The above information disclosed in this Background section is only for enhancement of understanding of the invention, and therefore it may contain information that does not form the prior art that is already known to a person of ordinary skill in the art.

SUMMARY

Aspects of embodiments of the present invention are directed to a light system including a modular controller and a wired sensor board. In some embodiments, the lighting system avoids the problems of large and bulky designs of the related art by having the sensors of the wired sensor board powered off of an additional secondary winding from the light driver's main windings and by sending sensor information to the light driver through a wired connection; thus, eliminating the need to include secondary power circuitry and wireless communication modules within the sensor board. Thus, the lighting system according to some embodiments of the present disclosure reduces (e.g., minimizes) the financial cost of commissioning and installation for large systems (e.g., for a lighting system with many nodes) because there are no additional wireless component in the sensor boards that need to be synchronized with the light driver and the overall system. Furthermore, as the wired sensor board communicates via a wired connection, in a large lighting system with many nodes, this reduces (e.g., significantly reduces) the wireless communication traffic and system noise that would otherwise be present in the designs of the related art.

According to some embodiments of the present disclosure, there is provided a light driver including: a converter configured to generate a drive signal for powering a light source based on a control signal; a modular controller board electrically coupled to a sensor board and configured to receive sensor data from the sensor board and to generate a first sensor control signal corresponding to the sensor data; and a primary controller configured to control the converter by generating the control signal based on the first sensor control signal.

In some embodiments, the converter includes: a transformer including a primary winding, a first secondary winding electrically coupled to the light source, and a second secondary winding electrically coupled to the sensor board, and the converter is configured to supply the drive signal to the light source through the first secondary winding, and to supply electrical power to the sensor board through the second secondary winding.

In some embodiments, the primary controller includes a power factor correction (PFC) controller configured to regulate a DC-level voltage of the drive signal by generating the control signal.

In some embodiments, the light driver further include: a main board on which the converter and the primary controller are positioned, wherein the modular controller board is physically stacked on top of, or is perpendicularly connected to, the main board, and wherein the modular controller board being electrically connected to the main board.

In some embodiments, the modular controller board includes: a processor configured to process the sensor data and to control operation of the light source by generating the first sensor control signal based on the sensor data.

In some embodiments, the modular controller board includes: a wireless module configured to wirelessly receive an external command from an external controller, and to relay the external command to the processor for processing, and wherein the processor is further configured to generate the first sensor control signal further based on the external command.

In some embodiments, the external controller includes a wireless wall dimmer, and the external command includes a dimmer setting.

In some embodiments, the external controller includes a mobile device configured to execute a user control application that issues the external command in response to a user input.

In some embodiments, the modular controller board is coupled to the sensor board through a wired connection including a plurality of wires that are ground shielded.

In some embodiments, the modular controller board is further configured to generate a second sensor control signal corresponding to the sensor data, and the light driver further includes: an intensity controller configured to control at least one of a light intensity of the light source and a color shade of the light source in response to the second sensor control signal.

In some embodiments, the light driver further includes: a rectifier configured to rectify an input signal to generate a rectified signal having a single polarity, wherein the converter is further configured to generate the drive signal based on the rectified signal.

In some embodiments, the converter is a DC-DC converter, the rectifier is a bridge rectifier, and the input signal is an alternating-current (AC) signal.

According to some embodiments of the present disclosure, there is provided a lighting system node including: a sensor board including a sensor configured to sense a parameter from the environment and to generate sense data; and a light driver including: a converter configured to generate a drive signal for powering a light source based on a control signal; a modular controller board electrically coupled to a sensor board and configured to receive sensor data from the sensor board and to generate a first sensor control signal corresponding to the sensor data; and a primary controller configured to control the converter by generating the control signal based on the first sensor control signal.

In some embodiments, the light driver further includes: a rectifier configured to rectify an input signal to generate a rectified signal having a single polarity, wherein the converter is further configured to generate the drive signal based on the rectified signal.

In some embodiments, the modular controller board is further configured to generate a second sensor control signal corresponding to the sensor data, and the light driver further includes: an intensity controller configured to control at least one of a light intensity of the light source and a color shade of the light source in response to the second sensor control signal.

In some embodiments, the light driver further includes: a main board on which the converter and the primary controller are positioned, wherein the modular controller board is physically stacked on top of, or is perpendicularly connected to, the main board, and wherein the modular controller board being electrically connected to the main board.

In some embodiments, the modular controller board includes: a processor configured to process the sensor data and to control operation of the light source by generating the first sensor control signal based on the sensor data; and a wireless module configured to wirelessly receive an external command from an external controller, and to relay the external command to the processor for processing, and wherein the processor is further configured to generate the first sensor control signal further based on the external command.

In some embodiments, the external controller includes a wireless wall dimmer, and the external command includes a dimmer setting.

In some embodiments, the external controller includes a mobile device configured to execute a user control application that issues the external command in response to a user input.

In some embodiments, the converter includes: a transformer including a primary winding, a first secondary winding electrically coupled to the light source, and a second secondary winding electrically coupled to the sensor board, wherein the converter is configured to supply the drive signal to the light source through the first secondary winding, and to supply electrical power to the sensor board through the second secondary winding.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

Figure 1:
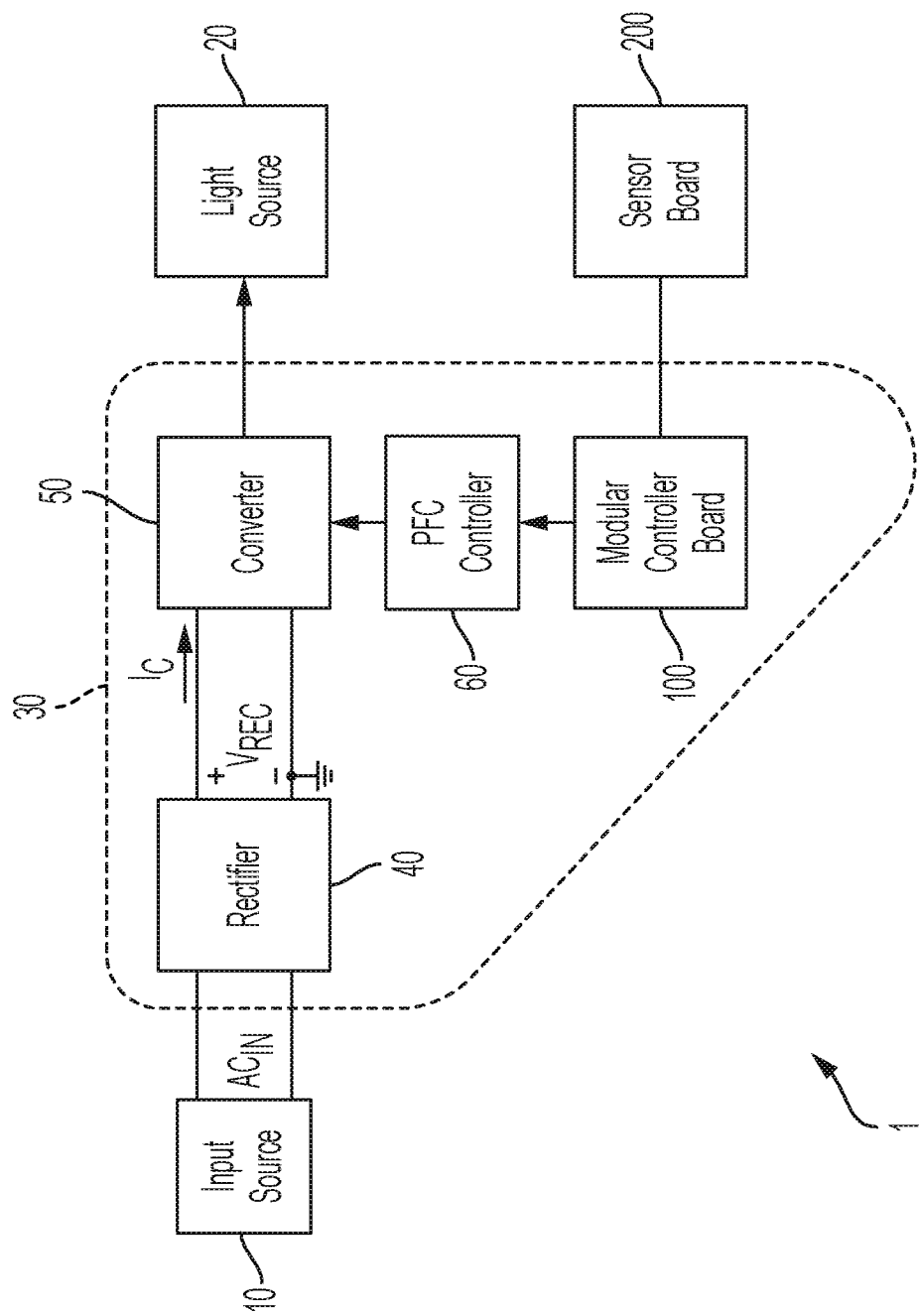
FIG. 1 illustrates a lighting system including a modular controller board and a wired sensor board, according to some example embodiments of the present disclosure.

The detailed description set forth below is intended as a description of example embodiments of a system and method for signal gain control in an LED driver, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Aspects of some embodiments of the present disclosure are directed to a light system including a modular controller (e.g., with wireless capability) and a wired sensor board. The lighting system according to the present disclosure is a low cost and low complexity solution to the wireless sensor and LED driver systems of the related art. The integration of a wired sensor board serves to provide at least the same amount of functionality as the wireless systems of the related art while reducing the operational and installation costs that larger fragmented systems offer. A desirable feature of such a system is the simplicity that is established from having the driver and processing software be the central point for control of the entire lighting system.

According to some embodiments, the lighting system avoids the problems of large and bulky designs of the related art by having the sensors of the wired sensor board powered off of an additional secondary winding from the light driver's main windings and by sending sensor information to the light driver through a wired connection; thus, eliminating the need to include secondary power circuitry and wireless communication modules within the sensor board. The solutions of the related art require AC power lines to be run to a wireless sensor that has its own dedicated driver to power the sensor as well as any wireless modules needed to communicate with the main control unit. In some embodiments, the use of a wired connection from the sensor board to the light driver also eliminates the need to use batteries to independently power each sensor within the sensor board.

Thus, the lighting system according to some embodiments of the present disclosure reduces (e.g., minimizes) the financial cost of commissioning and installation for large systems (e.g., for a lighting system with many nodes) because there are no additional wireless component in the sensor boards that need to be synchronized with the light driver and the overall system. Furthermore, as the wired sensor board communicates via a wired connection, a wireless module is not required to transmit information; thus, the sensors of the sensor board do not contribute to additional communication traffic. In a large lighting system (e.g., a lighting system with many nodes), this reduces (e.g., significantly reduces) the wireless communication traffic and system noise that would otherwise be present in the designs of the related art.

Additionally, the problems of having multi-master control in a multi-node system is eliminated as the sensor board and driver of each node operate under a single control software, rather than having overlapped independent software that try to issue commands on top of each other to control the same system.

FIG. 1 illustrates a lighting system 1 including a modular controller board 100 and a wired sensor board 200, according to some example embodiments of the present disclosure.

According to some embodiments, the lighting system 1 includes an input source 10, a light source 20, and a light driver 30 (e.g., a switched-mode power supply system with negative injection) for powering and controlling the brightness of the light source 20 based on the signal from the input source 10.

The input source 10 may include an alternating current (AC) power source that may operate at a 100 Vac (e.g., in Japan), 120 Vac (e.g., in the US), a 240 Vac (e.g., in Europe), or 277 Vac (e.g., in large industrial plants). The input source 10 may also include a dimmer electrically powered by said AC power sources. The dimmer may modify (e.g., cut/chop a portion of) the input AC signal according to a dimmer level before sending it to the light driver 30, and thus variably reduces the electrical power delivered to the light driver 30 and the light source 20. In some examples, the dimmer may be a TRIAC or ELV dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs) or an arc or gas discharge lamp with electronic ballasts, such as high intensity discharge (HID) or fluorescent lights.

In some embodiments, the light driver 30 includes a rectifier 40, a converter (e.g., a DC-DC converter) 50, and a primary controller (e.g., a power factor correction (PFC) controller) 60.

The rectifier 40 provides a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the primary controller 60). Another switched-mode converter (e.g., a transformer) inside the converter 50 produces the desired output voltage from the DC bus.

The primary controller 60 improves (e.g., increases) the power factor of the load on the input source 10 and reduces the total harmonic distortions (THD) of the light driver 30. As non-linear loads including the rectifier 40 and the converter 50 distort the current drawn from the input source 10, the primary controller 60 counteracts the distortion and raises the power factor. In some examples, other sources of current distortion may be input filter capacitors, input filter chokes, boost inductors, second stage transformers, and any non-linear elements or loads on the secondary side of a transformer inside the converter 50, which would be reflected over to the primary side of the transformer. Further, the main switch (e.g., the transistor) in the boost stage of the converter 50 may also distort the current if it is fed with a constant duty cycle or constant on-time. The primary controller 60 may be capable of counteracting current distortions regardless of the source.

According to some embodiments, the primary controller 60 controls the converter 50 to ensure that the input current IC to the converter 50 matches the waveform of the input voltage $V_{REC}$ generated by the rectifier 40. In so doing, the primary controller 60 may sense a current IC flowing through an inductor of the converter 50 (e.g., the inductor of the boost circuit), and compare this sensed current against the rectified input voltage $V_{REC}$. Based on this comparison, the primary controller 60 may generate a control signal that controls the on-off timing of a switching element in the converter 50 (e.g., the inductor of the boost circuit), which determines the shape of the input current waveform at the converter 50.

In some examples, the primary controller 60 operates by comparing the sensed inductor current flowing through the converter 50 with the rectified input voltage, and controlling the main switch within the converter 50 according to a modulation scheme (e.g., by controlling the switching frequency, duty cycle, on-time or off-time, etc.) to obtain a desired output voltage for application to the light source 20.

According to some embodiments, the sensor board 200 collects sensory information about the environment in which the light source 20 is located and provides that information to the modular controller board 100 through a wired connection. The modular controller board 100 in turn processes the sensory information and provides a corresponding control signal to the primary controller 60 for controlling the output of the light driver 30. The transfer of data over a wired connection eliminates the need for a wireless communication module on the sensor board, which reduces the cost, complexity, and size of the sensor board 200.

In some embodiments, the sensor board 200 does not use a separate AC power source that is independent of that used by light driver 30, and instead, receives its input electrical power from the light driver 30 (e.g., through the wired connection). As a result, the sensor board 200 does not require its own dedicated power supply and rectifier or internal battery to power the sensors and internal circuitry of the sensor board. This further reduces the cost, complexity, and size of the sensor board 200.

Figure 2A:
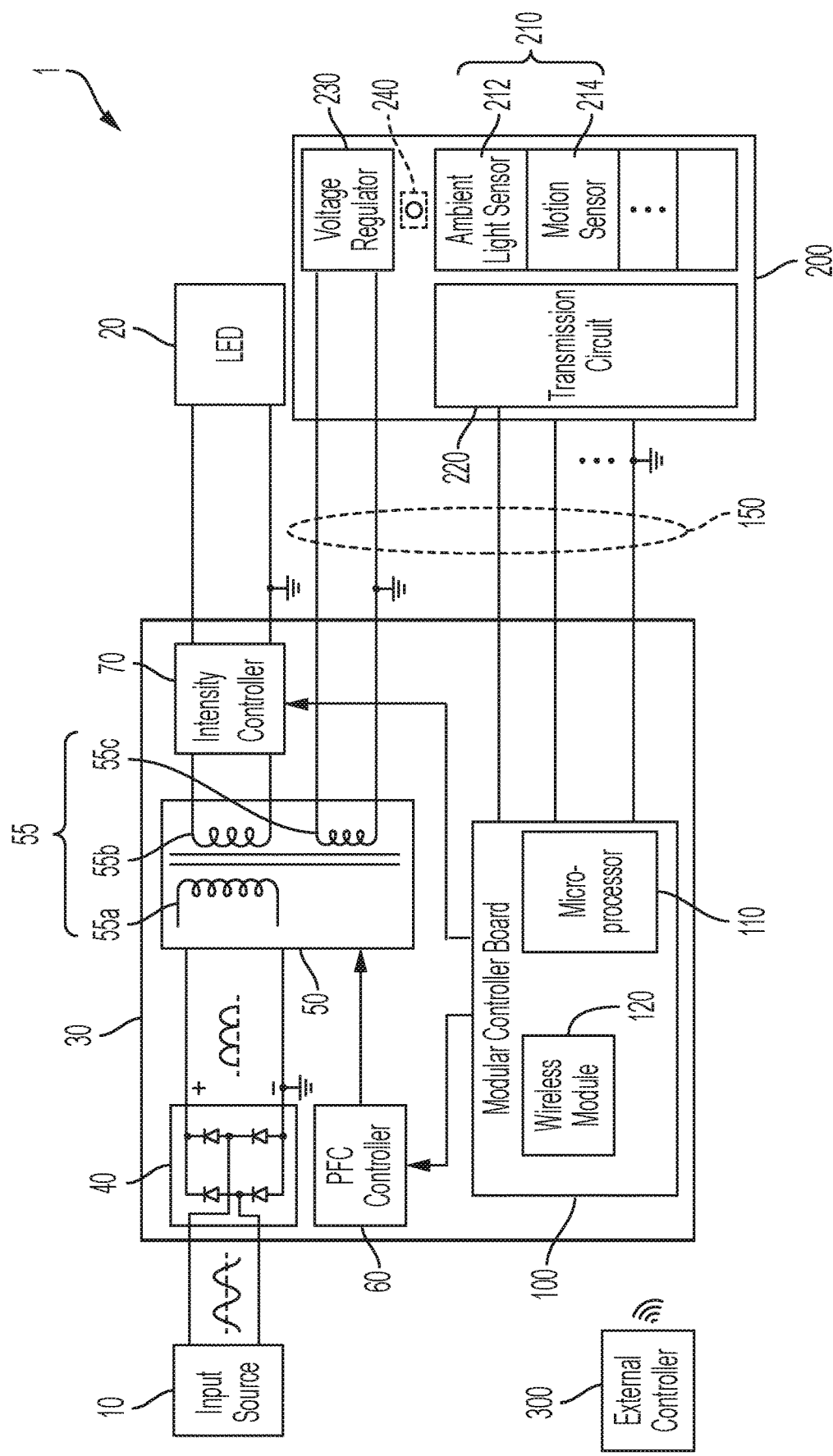
FIG. 2A is a block diagram illustrating a more detail view of the modular controller board and the wired sensor board of the lighting system, according to some example embodiments of the present disclosure.

FIG. 2A is a block diagram illustrating a more detail view of the modular controller board 100 and a wired sensor board 200 within the lighting system 1, according to some example embodiments of the present disclosure.

In some embodiments, the wired sensor board 200 houses one or more sensors including a motion sensor, an ambient sensor, and/or the like. In some embodiments, the wired sensor board 200 does not perform any data processing of the sensor data on its own, and instead sends the sensor data to the light driver 30 for processing.

According to some embodiments, the modular controller board 100 of the light driver 30 is electrically coupled to the sensor board 200 via a wired connection (e.g., an electrical cable) 150, through which it receives sensor data from the sensor board 200. The modular controller board 100 then generates a first sensor control signal (e.g., a PFC on/off signal) for transmission to the PFC controller 60 and/or a second sensor control signal for transmission to the intensity controller 70, where both of the first and second sensor control signals correspond to the sensor data. The intensity controller 70 controls the overall light output, and in some instances the color shade as well. As more or less power is drawn by the light source 20, the primary controller 60 instantaneously adjusts for the new output level. In some examples, when the ambient light sensor 212 detects a change in ambient light, the modular controller board 100 transmits a second sensor control signal to the intensity controller 70 to signal the intensity control 70 to modify (e.g., increase or decrease) the light output intensity of the light source 20. Further, when the light source 20 is off and the motion sensor 214 detects movement, the modular controller board 100 transmits a first sensor control signal to the PFC controller 60 to turn on the PFC controller 60 and to generate an appropriate voltage at the output of the converter 50, and also transmits a second sensor control signal to the intensity controller 70 to control the intensity of the light output of the light source 20.

The modular controller board 100 includes a processor 110 that processes the sensor data from the sensor board 200 and uses the data to control the operation of the light source 20 by changing the inputs to the intensity controller 70. In some embodiments, the modular controller board 100 also includes a wireless module 120 capable of wirelessly receiving an external command from an external controller 300, and relaying the external command to the processor 110 for processing. The processor 110 may further base the sensor control signal, which adjusts the output of the light driver 30, on the external command. The wireless module 120 may include a wireless transceiver capable of communicating via bluetooth, wifi, and/or the like. In some examples, the external controller 300 may be a wireless wall dimmer or light switch that wirelessly communicates a dimmer setting or an on/off state to the wireless module 120. The external controller 300 may also be a mobile device (e.g., a smart phone) running an application (e.g., a user control application) that issues the external command (e.g., a command to turn the light on/off or to change a dimmer setting) in response to a user input. In some examples, the external controller 300 may be a wireless occupancy sensor, or time scheduling system that communicates different commands (e.g., light settings) based on time of day, date, or it could be a device to configure the sensor(s) or the power-supply output, etc.

According to some embodiments, the light driver 30 delivers electrical power to the sensor board 200 through the wired connection 150. In some embodiments, converter 50 includes a transformer 55 having a primary winding 55a, a first secondary winding 55b electrically coupled to the light source 20, and a second secondary winding 55c electrically coupled to the sensor board 200. Here, the primary winding 55a and the first and second secondary windings 55b and 55c are all electrically isolated from one another, but magnetically coupled to one another. The converter 50 supplies the drive signal to the light source 20 through the first secondary winding 55b, and supplies electrical power to the sensor board 200, as a variable voltage, through the second secondary winding 55c. As such, the light driver 30 drives both the light source 20 and the sensor board via the same transformer and input source 10. As the light source 20 and the sensor board 200 are powered by separate secondary windings of the transformer 55, the sensor board 200 may receive power from the second secondary winding 55c even when the light source 20 is off. For example, the light driver 30 may lower the drive voltage to the light source 20 to such a low level that it can no longer forward bias the LEDs of the light source 20 resulting in the light source turning off; however, the voltage received through the second secondary winding 55c may be sufficient to power the sensor board 200. In some examples, a switch may be placed in the path of the drive signal that can stop the flow of current to the light source 20, while allowing power delivery through the second secondary winding 55c.

In some embodiments, the wired sensor board 200 houses a plurality of sensors 210, which may include an ambient light sensor 212, a motion sensor 214, and/or the like. The sensors 210 sense certain parameters from the environment and generate corresponding sensory outputs. For example, the ambient light sensor 212 detects ambient light intensity within the environment (e.g., within the room in which the sensor is installed), and the motion sensor detects motion within the environment. The processor 110 may utilize the sensed ambient light intensity to target a particular light output in the space. For example, the processor 110 may lower the drive signal thus reducing light output of the light source 20 at noon, and increase the drive signal and thus the light output in the evening. In some embodiments, the sensor board 200 also includes a transmission circuit 220 and a regulator 230.

The transmission circuit 220 may capture the sensory output from the sensors 210 and manipulate them as appropriate (e.g., amplify, change DC level of, etc. the sensory output) to generate sensed data for transmission to the light driver 30 through the wired connection 150. In some embodiments, the sensor board 200 does not perform any data processing of the sensed data on its own, and instead sends the sensed data to the light driver 30 for processing.

The regulator 230 receives the electrical power from the second secondary winding 55c of the light driver 30, which may be a variable DC voltage, and generates one or more regulated voltages (e.g., one or more regulated, constant, DC voltages) for powering the components of the sensor board 200 including the plurality of sensors 210 and the transmission circuit 220. For example, the regulator 230 may receive a DC voltage (with ripples) from the transformer 55 that is from about 6 V to about 15 V, and may generate a regulated 3.3 V DC voltage that powers the sensors 210 as well as the transmission circuit 220. The regulator 230 may be, for example, a linear regulator, a buck regulator, or a buck-boost regulator. As different sensors may have different voltage requirements, having a regulator on the sensor board 200 that can generate the desired voltages specific to its sensor (as opposed to having the light driver 30 produce those specific voltages) allows the light driver 30 to be compatible with a variety of sensor boards that may house different types of sensors with different voltage requirements.

In some examples, the sensor board 200 also includes an indicator light 240, such as a light emitting diode (LED), for providing a visual indication of the status of the sensor board 200 and/or one or more of the sensors 210 to a user. For example, the transmission circuit 220 is configured to drive the indicator light to emit a first color (e.g., green) in response to the sensor board receiving electrical power (e.g., being turned on), and to drive the indicator light to emit a second color (e.g., blue) in response to a motion being detected by the motion sensor 214. However, visual indications are not limited to use of different colors, and may also include blinking at different frequencies.

In some examples, the wired connection 150 may include a plurality of wires for delivering power to the regulator 230 from the second secondary winding 55c and for carrying the signals from the sensor board 200 to the modular controller board 100. As the second secondary winding 55c may produce a variable DC output with some ripple, to reduce or substantially reduce noise in the signals transmitting the sensor data, the wires are ground shielded (e.g., shielded by a conductive layer that is connected to electrical ground); however, embodiments of the present disclosure are not limited thereto. For example, the wires may have a ground shield to form a shielded cable. In some embodiments, each sensor of the plurality of sensors has a dedicated wired connection to modular controller board 100. The length of the wired connection 150 may vary depending on the desired distance between the sensor board 200 and the light driver 30 in a given application.

Figure 2B:
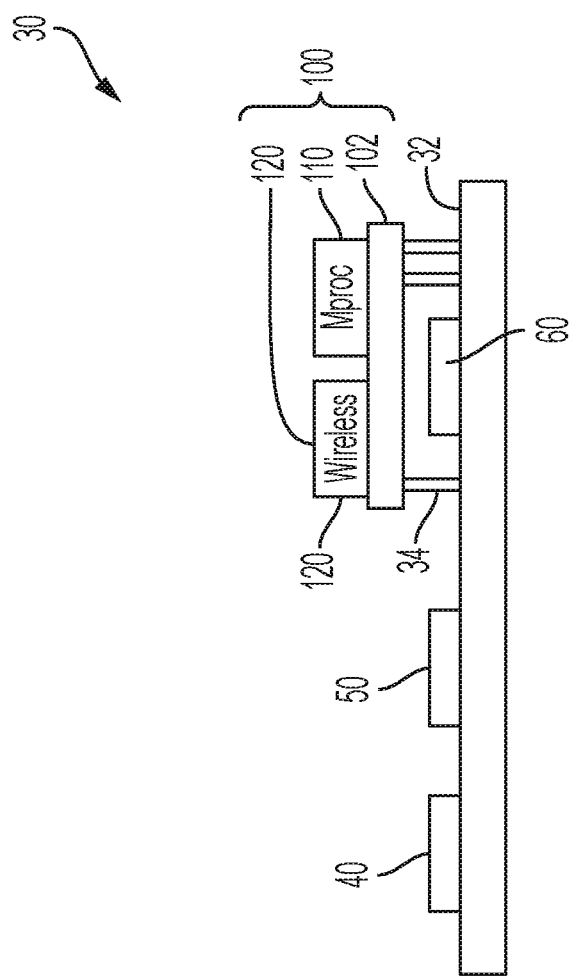
FIG. 2B is across-sectional view of a light driver of the lighting system, according to some example embodiments of the present disclosure.

FIG. 2B is across-sectional view of the light driver 30, according to some example embodiments of the present disclosure.

In some embodiments, the light driver 30 includes a main board (e.g., a main printed circuit board (PCB)) 32 on which the rectifier 40, the converter 50, and the primary controller 60 are positioned (e.g., are integrated), and the modular controller board 100 includes a secondary board (e.g., a secondary PCB or daughter card) 102 on which the processor 110 and the wireless module 120 are positioned (e.g., are integrated). The secondary board 102 is stacked vertically above the main board 32 and is electrically coupled to it through a plurality of vertical conductors (e.g., conductive vias) 34; however, embodiments of the present disclosure are not limited thereto. For example, the controller board 102 may be positioned perpendicular to the main board 32 and be connected at the edges of the controller board 102, thus eliminating the need for connectors and further reducing cost and complexity. The use of the secondary board 102 makes the design of the light driver 30 modular and makes it easier to creates variants of the light driver. For example, if an application does not require a wireless module, the modular controller board 100 may be replaced with one that does not include the wireless module 120. Similarly, if a different processor or wireless module are desired, the modular controller board 100 may be swapped out with a different module. In each example, the circuitry on the main board 32 remains the same. In addition to creating a modular design, the vertically stacked or perpendicularly arranged main and secondary boards 32 and 102 allow for three-dimensional of components, which improves space utilization, and allows the light driver 30 to have a compact design (e.g., one which fits within a common gangbox).

As will be recognized by a person of ordinary skill in the art, while FIG. 2B illustrates a particular arrangement of components of the light driver 30, this is merely for illustration purposes. For example, the position of the rectifier 40, the converter 50, and the primary controller 60 on the main board 32 may be changed in any suitable manner.

Figure 3:
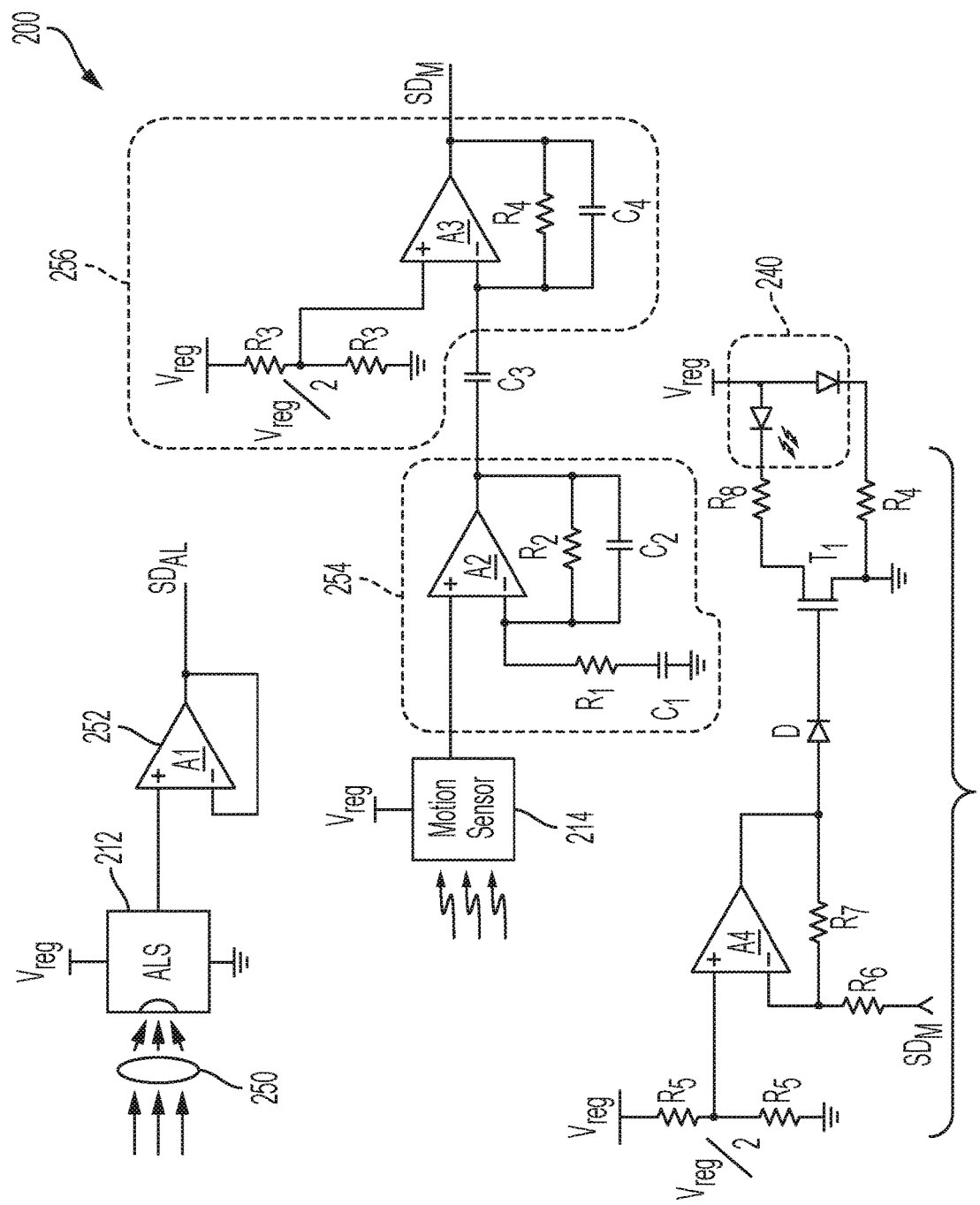
FIG. 3 is a schematic diagram of the sensor board, according to some embodiments of the present disclosure.

FIG. 3 is a schematic diagram of the sensor board 200, according to some embodiments of the present disclosure.

In some embodiments, the sensors 210 and transmission circuit 220 utilize the regulated voltage Vreg, which is produced by the voltage regulator 230, as their power source.

A lens 250 may be positioned in front of the ambient light sensor (ALS) 212 to focus the light incident on the ambient light sensor 212. With the lens 250, the ambient light sensor may mainly sense the light emitted from the area in front of the lens as opposed to light incident from the sides. In some examples, the ambient light sensor 212 may have a high impedance output; as such, a current buffer (e.g., a unity gain current buffer) 252 may be utilized to provide the low-impedance output, which can drive a signal (e.g., the ambient light sensor data SDAL) across a wire of the electrical cable 150 and which can improve noise immunity.

The output of the motion sensor may pass through two stages of amplification (i.e., 254 and 256) before being transmitted through a corresponding wire of the electrical cable 150. As it is desired to trigger off of movement and not static objects in the environment, the first amplifier circuit 254 generates an amplified signal when the sensor output crosses a threshold (at one or more of a falling edge and a rising edge). The second amplifier circuit 256, which may be AC coupled to the first amplifier circuit 254, may further amplify the signal prior to transmitting it (i.e., the motion sensor data SDM) through the electrical cable 150.

The current buffer 252, the first and second amplifier circuits 254 and 256 and the related components (e.g., resistors R1 to R4 and capacitors C1 to C4) may comprise the transmission circuit 220.

In some examples, the output of the second amplifier circuit 256 is passed onto the light indicator circuit 258, which can drive the indicator light 240 to change color when motion is detected.

In some examples, the transmission circuit 220 may be an entirely analog circuit (as, e.g., shown in FIG. 3) that produces the sensed data as analog signals to be sent over the electrical cable 150. However, embodiments of the present disclosure are not limited thereto, and the transmission circuit 220 may be an entirely digital circuit or a combination of analog and digital circuits.

Figure 4:
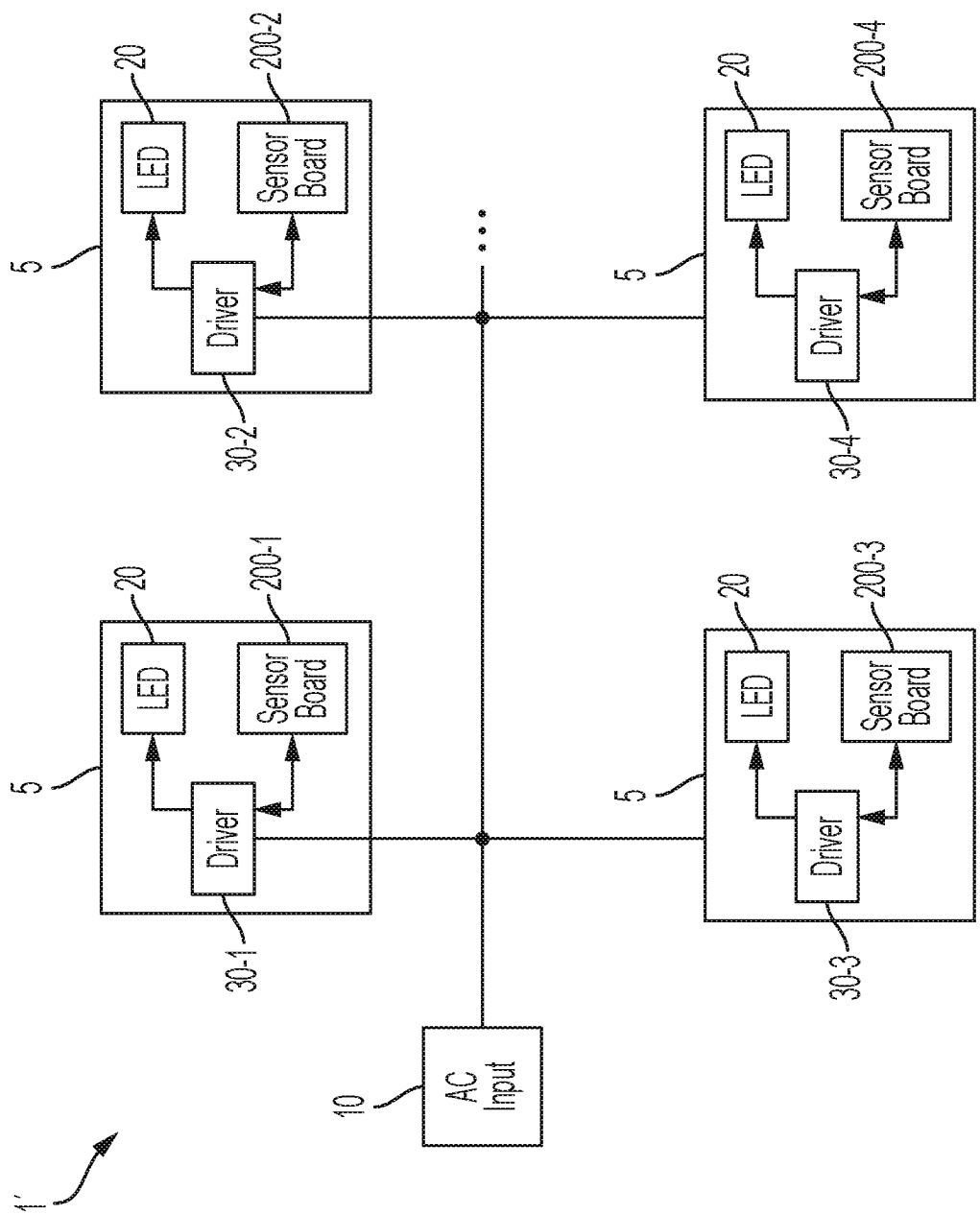
FIG. 4 is a block diagram illustrating a multi-node lighting system, according to some embodiments of the present disclosure.

FIG. 4 is a block diagram illustrating a multi-node lighting system 1', according to some embodiments of the present disclosure.

In some embodiments, multi-node lighting system 1' includes a plurality of nodes 5, each of which includes a light driver 30, a light source 20, and a sensor board 200. Each node 5 may have a single input source 10 and be controlled independently. Because the sensor connections in each of the nodes 5 are all wired, this reduces the overall system noise level that would otherwise be present in a multi-node lighting system utilizing wireless sensors. This reduces or substantially reduces the noise impact of the multi-node lighting system 1' on other electronic devices present in the environment in which the system 1' exists. Additionally, the use of wired connections reduces overall power usage as compared to the wireless sensor connections of the related art.

As recognized by a person of ordinary skill in the art, while FIG. 4 illustrates four nodes 5, this is merely for illustrative purposes, and the multi-node lighting system 1' may have any suitable number of nodes 5.

As described above, the wired lighting system drastically reduces hardware complexity and cost of the sensor board by utilizing a wired connection rather than a wireless one, by externalizing the data processing and power generation to the light driver. Labor cost from commissioning and installation are also reduced since the wired lighting system 1 eliminates additional external system components which would otherwise be implemented to independently operate the sensors from the driver and light source. Further, multi-master control issues are prevented since all processing aspects are controlled by the singular microprocessor and software of the modular controller board. Additionally, removing the wireless modules from the sensor board helps to reduced wireless traffic and noise injection from the high bandwidth sensors.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The light driver and/or any other relevant devices or components according to embodiments of the present invention described herein, such as the processor, the wireless module, and the primary controller, may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the light driver may be implemented on a flexible printed circuit film, a tape carrier package (TCP), a printed circuit board (PCB), or formed on the same substrate. Further, the various components of the light LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A light driver comprising:
    a converter configured to generate a drive signal for powering a light source based on a control signal;
    a modular controller board electrically coupled to a sensor board and configured to receive sensor data from the sensor board and to generate a first sensor control signal and a second sensor control signal corresponding to the sensor data;
    a primary controller configured to control the converter by generating the control signal based on the first sensor control signal; and
    an intensity controller configured to control at least one of a light intensity of the light source or a color shade of the light source in response to the second sensor control signal.

2. The light driver of claim 1, further comprising:
    a rectifier configured to rectify an input signal to generate a rectified signal having a single polarity,
    wherein the converter is further configured to generate the drive signal based on the rectified signal.

3. The light driver of claim 1, wherein the primary controller includes a power factor correction (PFC) controller configured to regulate a DC-level voltage of the drive signal by generating the control signal.

4. The light driver of claim 1, further comprising:
    a main board on which the converter and the primary controller are positioned,
    wherein the modular controller board is physically stacked on top of, or is perpendicularly connected to, the main board, and
    wherein the modular controller board is electrically connected to the main board.

5. The light driver of claim 1, wherein the modular controller board comprises:
    a processor configured to process the sensor data and to control operation of the light source by generating the first sensor control signal based on the sensor data.

6. The light driver of claim 5, wherein the modular controller board comprises:
a wireless module configured to wirelessly receive an external command from an external controller, and to relay the external command to the processor for processing, and
wherein the processor is further configured to generate the first sensor control signal further based on the external command.

7. The light driver of claim 6, wherein the external controller comprises a wireless wall dimmer, and
wherein the external command comprises a dimmer setting.

8. The light driver of claim 6, wherein the external controller includes a mobile device configured to execute a user control application that issues the external command in response to a user input.

9. The light driver of claim 1, wherein the modular controller board is coupled to the sensor board through a wired connection comprising a plurality of wires that are ground shielded.

10. The light driver of claim 2, wherein the converter is a DC-DC converter, the rectifier is a bridge rectifier, and the input signal is an alternating-current (AC) signal.

11. A light driver comprising:
a converter configured to generate a drive signal for powering a light source based on a control signal;
a modular controller board electrically coupled to a sensor board and configured to receive sensor data from the sensor board and to generate a first sensor control signal corresponding to the sensor data; and
a primary controller configured to control the converter by generating the control signal based on the first sensor control signal,
wherein the converter comprises:
a transformer comprising a primary winding, a first secondary winding electrically coupled to the light source, and a second secondary winding electrically coupled to the sensor board, and
wherein the converter is configured to supply the drive signal to the light source through the first secondary winding, and to supply electrical power to the sensor board through the second secondary winding.

12. A lighting system node comprising:
a sensor board comprising a sensor configured to sense a parameter from the environment and to generate sense data; and
a light driver comprising:
a converter configured to generate a drive signal for powering a light source based on a control signal;
a modular controller board electrically coupled to the sensor board and configured to receive sensor data from the sensor board and to generate a first sensor control signal and a second sensor control signal corresponding to the sensor data;
a primary controller configured to control the converter by generating the control signal based on the first sensor control signal; and
an intensity controller configured to control at least one of a light intensity of the light source or a color shade of the light source in response to the second sensor control signal.

13. The lighting system node of claim 12, wherein the converter comprises:
a transformer comprising a primary winding, a first secondary winding electrically coupled to the light source, and a second secondary winding electrically coupled to the sensor board,
wherein the converter is configured to supply the drive signal to the light source through the first secondary winding, and to supply electrical power to the sensor board through the second secondary winding.

14. The lighting system node of claim 12, wherein the light driver further comprises:
a rectifier configured to rectify an input signal to generate a rectified signal having a single polarity,
wherein the converter is further configured to generate the drive signal based on the rectified signal.

15. The lighting system node of claim 12, wherein the modular controller board comprises:
a processor configured to process the sensor data and to control operation of the light source by generating the first sensor control signal based on the sensor data; and
a wireless module configured to wirelessly receive an external command from an external controller, and to relay the external command to the processor for processing, and
wherein the processor is further configured to generate the first sensor control signal further based on the external command.

16. The lighting system node of claim 12, wherein the light driver further comprises:
a main board on which the converter and the primary controller are positioned,
wherein the modular controller board is physically stacked on top of, or is perpendicularly connected to, the main board, and
wherein the modular controller board being electrically connected to the main board.

17. The lighting system node of claim 15, wherein the external controller includes a mobile device configured to execute a user control application that issues the external command in response to a user input.

18. The lighting system node of claim 15, wherein the external controller comprises a wireless wall dimmer, and
wherein the external command comprises a dimmer setting.

* * * * *